United States Patent
Shono

(10) Patent No.: US 8,989,932 B2
(45) Date of Patent: Mar. 24, 2015

(54) ELECTRIC VEHICLE

(75) Inventor: Yumi Shono, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 144 days.

(21) Appl. No.: 13/615,549

(22) Filed: Sep. 13, 2012

(65) Prior Publication Data

US 2013/0079963 A1 Mar. 28, 2013

(30) Foreign Application Priority Data

Sep. 26, 2011 (JP) .................................. 2011-209861

(51) Int. Cl.
*B60L 9/00* (2006.01)
*H02K 9/19* (2006.01)

(52) U.S. Cl.
CPC *H02K 9/19* (2013.01); *Y02T 10/641* (2013.01)
USPC .............................. 701/22; 702/63; 123/41.27

(58) Field of Classification Search
USPC ................. 702/63; 701/22; 210/141; 165/41; 137/486; 62/196.1; 320/166; 123/41.27
See application file for complete search history.

(56) References Cited

U.S. PATENT DOCUMENTS

| | | | | | |
|---|---|---|---|---|---|
| 3,628,663 | A | * | 12/1971 | Derham et al. | ............... 210/141 |
| 4,066,095 | A | * | 1/1978 | Massa | ........................... 137/486 |
| 4,628,872 | A | * | 12/1986 | Ogawa et al. | .............. 123/41.27 |
| 5,529,114 | A | * | 6/1996 | Hall et al. | ........................ 165/41 |
| 7,386,987 | B2 | | 6/2008 | Hirota | |
| 8,612,073 | B2 | * | 12/2013 | Fuji et al. | ......................... 701/22 |
| 2013/0073234 | A1 | * | 3/2013 | LePort et al. | ................... 702/63 |
| 2013/0152614 | A1 | * | 6/2013 | Traudt et al. | ................. 62/196.1 |

FOREIGN PATENT DOCUMENTS

| | | |
|---|---|---|
| JP | 09-019163 | 1/1997 |
| JP | 2005-273930 A | 10/2005 |
| JP | 2007-244070 A | 9/2007 |
| JP | 2008-309134 A | 12/2008 |
| JP | 2009-222569 A | 10/2009 |
| JP | 2010-276035 A | 12/2010 |
| JP | 2011-172406 A | 9/2011 |

* cited by examiner

*Primary Examiner* — John Q Nguyen
*Assistant Examiner* — Aaron Smith
(74) *Attorney, Agent, or Firm* — Gifford, Krass, Sprinkle, Anderson & Citkowski, P.C.

(57) ABSTRACT

An electric vehicle includes an electric motor, an inverter that supplies electric power to the electric motor, a radiator that cools a coolant, a coolant passage that is configured to circulate the coolant through the electric motor, the inverter and the radiator, a plurality of liquid leakage detection sensors (flow sensors) provided in the coolant passage, a plurality of valves provide in the coolant passage, and a controller. The controller is configured to close valves provided at two locations, between which a portion where leakage of the coolant is detected by the liquid leakage detection sensors is located.

12 Claims, 2 Drawing Sheets

ELECTRIC VEHICLE

CROSS REFERENCE TO RELATED APPLICATIONS

This application claims priority to Japanese Patent Application No. 2011-209861 filed on Sep. 26, 2011, which is incorporated herein by reference in its entirety including the specification, drawings and abstract.

BACKGROUND OF THE INVENTION

1. Field of the Invention

The invention relates to an electric vehicle having a traction electric motor, such as a pure electric vehicle, a hybrid vehicle, or a fuel cell vehicle.

2. Description of Related Art

An electric vehicle includes a traction electric motor, and an inverter that converts direct-current power of a battery into alternating-current power that is suitable to drive the electric motor. Since the inverter handles large current in order to drive the electric motor, the inverter produces a large amount of heat. That is, the electric vehicle has at least two heat-producing sources that include an electric motor and an inverter. Each heat-producing source is provided with a cooling apparatus in order to restrain temperature rise of the heat-producing source.

Typically, liquid (water, long life coolant (LLC) or oil, for example) is used as a coolant. If the coolant leaks, the cooling capability significantly declines. A technology that detects leakage of a coolant is proposed in Japanese Patent Application Publication No. 2008-309134 (JP 2008-309134 A). Furthermore, a technology that lessens the amount of leakage of a coolant caused when the coolant passage is damaged is proposed in Japanese Patent Application Publication No. 2010-276035 (JP 2010-276035 A).

SUMMARY OF THE INVENTION

The invention provides an electric vehicle capable of maintaining its cooling function as much as possible even when leakage of a coolant occurs.

An electric vehicle according to a first aspect of the invention includes an electric motor, an inverter that supplies electric power to the electric motor, a radiator that cools a coolant, and a coolant passage that is configured to circulate the coolant through the electric motor, the inverter and the radiator. The coolant passage is provided with a plurality of liquid leakage detection sensors and a plurality of valves. A controller for the cooling system is configured to close valves provided at two locations, between which a portion where liquid leakage has been detected by the liquid leakage detection sensors is located.

An electric vehicle according to a second aspect of the invention includes: a cooling system that cools a heat-producing object by a coolant and that includes a radiator that cools the coolant, a coolant passage configured to circulate the coolant through the heat-producing object and the radiator, and a coolant circulation pump provided on the coolant passage; a plurality of liquid leakage detection sensors provided in the coolant passage; a plurality of valves provided in the coolant passage; and a controller configured to close, of the plurality of valves, valves provided at two locations, between which a portion where liquid leakage has been detected by the liquid leakage detection sensors is located.

In the case of electric vehicles, it is not preferable to immediately stop all the functions of the vehicle simply because leakage of the coolant has occurred. It is desirable that an electric vehicle can maintain the traveling capability as much as possible even when leakage of the coolant occurs. Furthermore, in the case of an electric vehicle, it is preferable to discharge electric charge stored in the inverter when the vehicle has a collision. In order to cause the functions for the electrical discharge to normally operate, it is also desirable that the electric vehicle can maintain the traveling capability as much as possible even when leakage of the coolant occurs. In particular, in the case of a cooling apparatus in which the coolant is circulated to the inverter and the electric motor, it is not preferable to stop the entire cooling apparatus because of liquid leakage (coolant leakage) present at one location. It is preferable that even when liquid leakage occurs at one of the inverter and the electric motor, the cooling of the other one of the inverter and the electric motor can be continued. The electric vehicle of the invention is able to stop liquid leakage (coolant leakage) by closing the valves provided at two locations, between which the portion of the liquid leakage is located, and is able to continue the cooling of appliances, such as the inverter, the electric motor, etc., by using the remaining coolant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS (First Embodiment)

Figure 1:
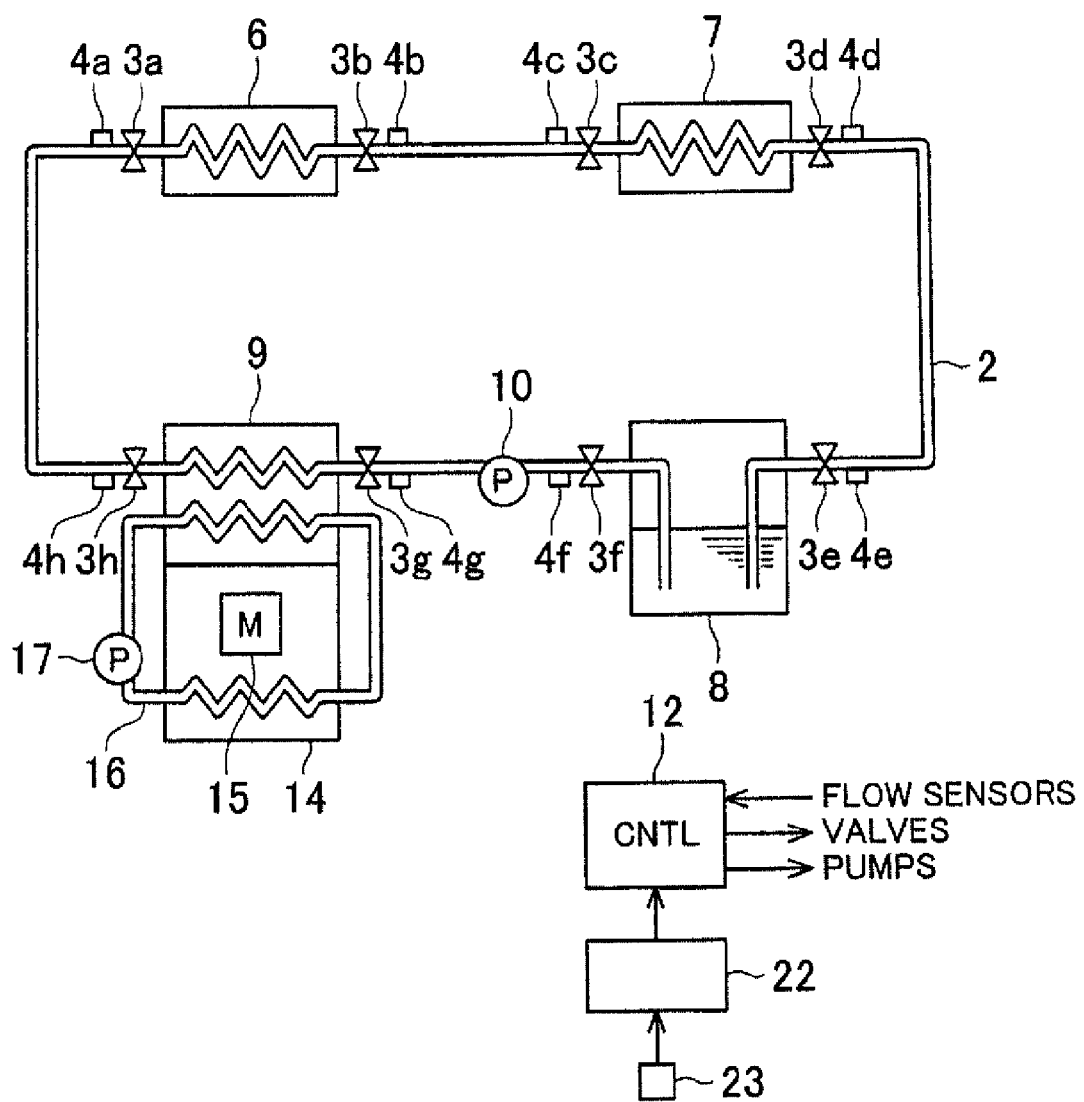
FIG. 1 is a block diagram of a cooling system of a first embodiment of the invention.

FIG. 1 shows a block diagram of a cooling system 100 in accordance with a first embodiment of the invention. The cooling system 100 is mounted in a hybrid vehicle that includes an electric motor 15 for driving wheels and an engine (not shown). The engine and the electric motor 15 of the hybrid vehicle are disposed within a case of a drive train 14. Within the drive train 14, there is also provided a motive power distributing mechanism (not shown). The motive power distributing mechanism is a gear set that distributes/combines the power of the electric motor 15 and the power of the engine and transmits the power to an axle of the vehicle. An inverter 7 converts direct-current power of a battery (not shown) into alternating-current power, and supplies the alternating-current power to the electric motor 15. The inverter 7 also has a function of converting regenerative electric power (alternating-current power) that the electric motor 15 generates at the time of braking, into direct-current power that is suitable for charging the battery.

A cooling system 100 cools the inverter 7 and the electric motor 15. The cooling system 100 cools the inverter 7 and the electric motor 15 by circulating coolant in a coolant passage 2 that is circularly arranged so as to pass through the inverter 7, the electric motor 15 and a radiator 6. Air that the radiator 6 receives while the vehicle is traveling cools the coolant. The coolant is, for example, long life coolant (LLC). The LLC is a coolant that is generally called radiator fluid, and is an antifreeze liquid such as ethylene glycol or the like. Incidentally, in the hybrid vehicle of this embodiment, strictly speaking, the coolant of the cooling system 100 does not directly cool the electric motor 15. The drive train 14 provided with the built-in electric motor 15 is equipped with its own cooling system that uses oil as a coolant and that includes a coolant passage 16 and a pump 17. The coolant of the cooling system 100 takes heat from the oil at an oil cooler 9. That is, the coolant of the cooling system 100 indirectly cools the electric motor 15. The pump 17 may be an electric pump, or may also be a pump that utilizes rotation of the electric motor or of the engine.

The coolant passage 2 of the cooling system 100 further includes a reserve tank 8 and a pump 10 (coolant circulation pump). The reserve tank 8 is a tank that temporarily stores the coolant that is circulated in the coolant passage 2. The pump 10 is provided for circulating the coolant. The pump 10 is an electric pump.

The coolant passage 2 further includes a plurality of valves 3a to 3h and a plurality of flow sensors 4a to 4h. The valves 3a to 3h are disposed at inlets and outlets (upstream sides and downstream sides in the flow direction of the coolant) of the radiator 6, the inverter 7, the reserve tank 8 and the oil cooler 9. Likewise, the flow sensors 4a to 4h are disposed at the inlets and the outlets (the upstream sides and the downstream sides in the flow direction of the coolant) of the radiator 6, the inverter 7, the reserve tank 8 and the oil cooler 9. In other words, a pair of a valve and a flow sensor is disposed at each of the inlets and the outlets (the upstream sides and the downstream sides) of the radiator 6, the inverter 7, the reserve tank 8 and the oil cooler 9. Hereinafter, the valves 3a to 3h, when collectively referred to, are termed the valves 3, and the flow sensors 4a to 4h, when collectively referred to, are termed the flow sensors 4.

The sensor data obtained by the flow sensors 4 (regarding the flow rate of the coolant at each of their positions) is sent to a controller 12 that controls the cooling system 100. The valves 3 are electromagnetic valves, and the opening and closing of the valves 3 is controlled by the controller 12. The controller 12 controls the valves 3 and the pump 10 based on the sensor data from the flow sensors 4. Next, a process that the controller 12 executes will be described.

Firstly, the controller 12, in a normal operation, adjusts the output of the pump 10 according to the temperature of the coolant (or the temperature of the inverter 7 and the temperature of the electric motor 15). The coolant passage is equipped with a temperature sensor (not shown) that measures the temperature of the coolant. The temperature of the inverter 7 is measured by a temperature sensor (not shown) that is provided for the inverter 7. The temperature of the electric motor 15 is measured by a temperature sensor (not shown) that is provided for the electric motor 15. The cooling system 100 controls the pump 10 so as to keep the temperature of the coolant within a certain range.

The controller 12 acquires sensor data from all the flow sensors 4 in a predetermined cycle (control cycle). The controller 12 compares the flow rates measured by two adjacent flow sensors. If there is a difference between the measured flow rates, the controller 12 determines that the coolant is leaking between the two flow sensors. For example, if there is a difference between the flow rates measured by the flow sensors 4a and 4b, the controller 12 determines that the coolant is leaking between the flow sensors 4a and 4b, that is, at the radiator 6. Furthermore, for example, if there is a difference between the flow rates measured by the flow sensors 4c and 4d, the controller 12 determines that the coolant is leaking between the flow sensors 4c and 4d, that is, at the inverter 7. Still further, for example, if there is a difference between the flow rates measured by the flow sensors 4b and 4c, the controller 12 determines that the coolant is leaking between the flow sensors 4b and 4c, that is, in a passage section that is a portion of the coolant passage 2 and that connects the radiator 6 and the inverter 7. That is, in the cooling system 100, two adjacent flow sensors constitute a liquid leakage detection sensor.

If the controller 12 determines that the coolant is leaking, the controller 12 closes the two valves at both sides of the location of the liquid leakage. In a detailed description, if there is a difference between the flow rates measured by two adjacent flow sensors, the controller 12 closes the two valves, each of which makes a pair with a corresponding one of the two flow sensors. For example, if there is a difference between the data measured by the flow sensors 4a and 4b, the controller 12 closes the valves 3a and 3b. Furthermore, for example, if there is a difference between the data measured by the flow sensors 4b and 4c, the controller 12 closes the valves 3b and 3c. Still further, for example, if there is a difference between the data measured by the flow sensors 4c and 4d, the controller 12 closes the valves 3c and 3d.

Next, the controller 12 controls the pump 10 so that the flow direction of the coolant reverses periodically. Specifically, the controller 12 periodically switches the operation of the pump 10 between the forward and reverse directions. This control makes it possible to move the coolant in the coolant passage 2 even through a portion of the coolant passage 2 is closed, and therefore decline of the cooling capability can be minimized. The coolant circulation pump may be a pump that itself is able to reverse discharge direction in which the coolant circulation pump discharges the coolant. Although in the case of a pump that itself is not able to operate in a reverse manner, the coolant circulation pump may be configured to be able to actually reverse the discharge direction by combining three-way valves etc. in the portion of the passage (piping) connected to the pump. In this case, these valves and the pump that is not able to operate in a reverse manner may be regarded as components of the coolant circulation pump of the invention that is able to reverse the discharge direction.

A modification of the foregoing process executed by the controller 12 will be described. The controller 12, when liquid leakage is detected, firstly closes one of the two valves that respectively make pairs with the two flow sensors 4 that have detected the liquid leakage. Subsequently, the controller 12 drives the pump 10 so that the coolant flows from the other one of the two valves toward the reserve tank 8. For example, if liquid leakage is detected between the flow sensors 4a and 4b (i.e., if there is a difference between the flow rates measured by the flow sensors 4a and 4b), the controller 12 firstly closes the valve 3a. Subsequently, the controller 12 controls the operation direction (rotation direction) of the pump 10 so that the coolant flows from the valve 3b toward the reserve tank 8. In FIG. 1, the pump 10 is controlled so that the coolant flows clockwise. The controller 12 closes the valve 3b after operating the pump 10 for a certain period of time (e.g., 10 seconds). Then, the controller 12 periodically switches the operation of the pump 10 between the forward and reverse directions.

The sequence in which the valves are closed may begin at either one of the two sides of a location of liquid leakage. In the case where liquid leakage is detected between the flow sensors 4a and 4b, the valve 3a is firstly closed and then the valve 3b is closed in the foregoing description. However, the controller 12 may also close the valves in the reverse sequence. That is, in the case where liquid leakage is detected between the flow sensors 4a and 4b, the controller 12 may execute the following procedure. That is, the controller 12 firstly closes the valve 3b. Subsequently, the controller 12 controls the rotation direction of the pump 10 so that the coolant flows from the valve 3a toward the reserve tank 8. In FIG. 1, the pump 10 is controlled so that the coolant flows counterclockwise. The controller 12 closes the valve 3a after operating the pump 10 for a certain period of time (e.g., 10 seconds). Then, the controller 12 periodically switches the operation of the pump 10 between the forward and reverse directions.

By controlling the pump 10 as described above after closing one of the two valves, the coolant at and around the location of the liquid leakage can be returned to the reserve tank 8. That is, it is possible to reduce the amount of liquid leakage. Better cooling capability can be obtained if a larger amount of the coolant remains when the operation of the pump 10 is periodically switched between the forward and reverse operation directions after the valves at both sides of the location of the liquid leakage are closed.

Still another mode of the process that the controller 12 executes will be described. The controller 12 receives a signal from an upper layer controller, that is, an HV controller 22 (i.e., a controller that comprehensively controls the entire hybrid vehicle) when the vehicle has a collision. The HV controller 22 monitors signals sent from an acceleration sensor 23 that is provided in an airbag system, and determines that the vehicle has collided when the value of the acceleration exceeds a predetermined threshold value. The HV controller 22, after determining that the vehicle has collided based on sensor data from the acceleration sensor 23, sends to the controller 12 a signal that notifies the occurrence of the collision. Next, a process that the controller 12 executes upon receiving the signal that shows that the vehicle has collided will be described. In this embodiment, the HV controller 22 and the acceleration sensor 23 function as a collision determination system.

Upon receiving the signal that shows the occurrence of a collision of the vehicle, the controller 12 collects sensor data from the flow sensors 4, and checks whether there is liquid leakage. If liquid leakage is detected, the controller 12 closes the valves at both sides of the location of the liquid leakage, and sends data about the location of the liquid leakage to the upper layer controller, that is, the HV controller 22. When the vehicle collides, the HV controller 22 performs a process of releasing the electric charges remaining in the inverter 7. At this time, the discharging can be carried out by a method that uses the inverter 7 or a method that uses the electric motor 15. In the method that uses the inverter 7, for example, a switching element is randomly operated so that electric energy is dissipated by the switching loss while the electric motor 15 is prevented from rotating. In the method that uses the electric motor 15, the inverter 7 is caused to perform such a switching operation as to rotate the electric motor 15, whereby electric energy is dissipated by the loss due to the rotation of the electric motor 15. In the case where the electric motor 15 is used, it is also preferable to drive the electric motor 15 while applying a certain braking force to the wheels. In the case where the inverter 7 is used, it is preferable to minimize the heat production in the inverter 7. In the case where the electric motor 15 is used (in this case, the inverter is used as well), it is preferable to minimize the heat production in the electric motor 15. Therefore, the HV controller 22 notifies the controller 12 of which one of the inverter 7 and the electric motor 15 is to be used as a discharging means. The controller 12 drives the pump 10 in such a direction as to send the coolant from the reserve tank 8 to an appliance that is one of the inverter 7 and the electric motor 15 and that is designated as the discharging means.

For example, it is assumed that, after receiving a signal that shows the occurrence of a collision, the controller 12 detects that there is liquid leakage occurring between the flow sensors 4a and 4b. The controller 12 closes the valves 3a and 3b, and notifies the HV controller 22 that liquid leakage has occurred between the valves 3a and 3b. For example, after the controller 12 receives from the HV controller 22 a signal that indicates that the inverter 7 is to be used as a discharging means, the controller 12 controls the pump 10 so that the coolant flows from the reserve tank 8 toward the inverter 7, that is, so that the coolant flows counterclockwise in FIG. 1. Alternatively, after the controller 12 receives from the HV controller 22 a signal that indicates that the electric motor 15 is to be used as a discharging means, the controller 12 controls the pump 10 so that the coolant flows from the reserve tank 8 toward the electric motor 15, that is, so that the coolant flows clockwise in FIG. 1.

Through the above-described process, at the time of a collision of the vehicle, the cooling system 100 sends the largest possible amount of the coolant to the device (the inverter 7 or the electric motor 15) selected as the discharging means. Through such a process, it is possible to cool the device as much as possible that is used for the electric discharge.

(Second Embodiment)

Figure 2:
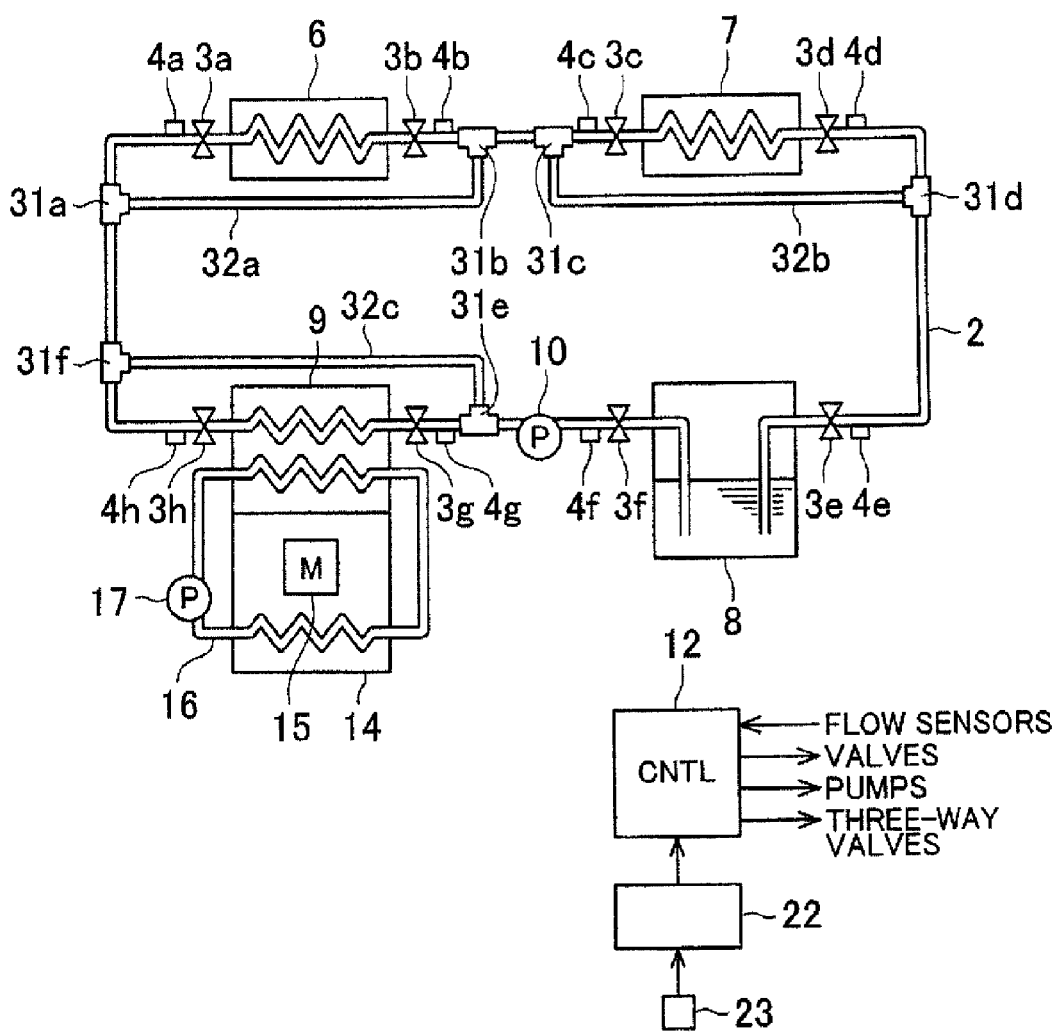
FIG. 2 is a block diagram of a cooling system of a second embodiment of the invention.

FIG. 2 shows a block diagram of a cooling system 200 of a second embodiment of the invention. The cooling system 200 of the second embodiment includes the constructions of the cooling system 100 of the first embodiment, and further includes three-way valves 31a to 31f, and bypass passages 32a, 32b and 32c. The three-way valves 31a to 31f are controlled by the controller 12 so as to switch between the coolant passage that is circularly arranged so as to pass through the radiator 6, the inverter 7, the reserve tank 8 and the oil cooler 9 (which is similar to the coolant passage shown in FIG. 1) and passages, each of which bypasses a portion of the coolant passage.

The bypass passage 32a is a passage that bypasses the radiator 6 (a passage portion connecting the valves 3a and 3b). The controller 12 is able to control the three-way valves 31a and 31b so as to switch between the passage that passes through the radiator 6 and the bypass passage 32a. The bypass passage 32b is a passage that bypasses the inverter 7 (a passage portion connecting the valves 3c and 3d). The controller 12 is able to control the three-way valves 31c and 31d so as to switch between the passage that passes through the inverter 7 and the bypass passage 32b. The bypass passage 32c is a passage that bypasses the oil cooler 9 (a passage portion connecting the valves 3g and 3h). The controller 12 is able to control the three-way valves 31e and 31f so as to switch between the passage that passes through the oil cooler 9 and the bypass passage 32c.

If the controller 12 detects liquid leakage in any one of the passage portions (sections) between the flow sensors 4a and 4b, between the flow sensors 4c and 4d and between the flow sensors 4g and 4h, the controller 12 closes corresponding ones of the valves 3a to 3h, and controls the three-way valves 31 so that the coolant passes through the passage (bypass passage) that bypasses the section in which the leakage of the coolant is present. Since the bypass passages are provided as described above, it is possible to maintain circulation of the coolant even when liquid leakage occurs locally.

With regard to the technologies and the like described above in conjunction with the embodiments, several notes will be given below. In any one of the aforementioned cases, the controller 12 drives the pump 10 with its maximum output, upon detecting liquid leakage. In other words, the controller 12 is capable of operating the pump 10 in at least two modes, that is, a low-operation-speed mode and a high-operation-speed mode, and operates the pump 10 in the high-operation-speed mode if liquid leakage is detected.

The controller 12 may acquire sensor data from the flow sensors 4 on a regular basis (e.g., every one second) and may check whether there is liquid leakage, or may also check whether there is liquid leakage upon input of a signal that shows that the vehicle has collided. As for the latter case, it can alternatively be expressed that the controller 12 executes the above-described process if the acceleration that acts on the vehicle exceeds a predetermined threshold acceleration.

In the foregoing embodiments, when the controller 12 closes the valves provided at two locations, between which the portion of liquid leakage is located, the controller 12 closes one of the valves, and controls the pump 10 so that the coolant moves from the other valve toward the reserve tank 8, and then closes the other of the valves. It is also preferable that after closing the other of the valves, the controller 12 sequentially close the valves in the order that starts with the valve closest to the other of the valves and that ends with the valve closest to the reserve tank 8.

The bypass passages 32a to 32c in the second embodiment are not limited to the routes shown in FIG. 2. For example, a bypass passage that bypasses two appliances (e.g., the radiator 6 and the inverter 7) may also be provided.

In the cooling systems 100 and 200 of the foregoing embodiments, the inverter 7 and the electric motor 15 are heat-producing objects, that is, objects to be cooled. The technologies disclosed by this specification may also be intended to cool devices besides an inverter and an electric motor. For example, the cooling system may also have a coolant passage that is circularly arranged so as to pass through an inverter, an electric motor and a battery and that cools those devices. Alternatively, another cooling system may also have a coolant passage that is circularly arranged so as to pass through an inverter, an electric motor and an engine and that cools those devices.

The cooling system of each of the foregoing embodiments isolates a location where liquid leakage is detected, from the pump (and the devices to be cooled) by closing the valves provided at the two locations. In other words, the controller closes the valves provided at the two locations, between which the portion of liquid leakage is located, so as to isolate the location of liquid leakage from a coolant passage portion that includes the coolant circulation pump. Incidentally, the valves to be closed in the foregoing case are preferably the valves provided at two adjacent locations on either side of the location where the liquid leakage has been detected, but may also be valves other than those valves at the two adjacent locations. For example, a configuration may be employed, in which the valves are closed that are provided at two locations, between which a passage portion that includes the portion where liquid leakage has been detected and the valve that is the closest to the portion of the liquid leakage is located.

Each of the cooling systems 100 and 200 of the embodiments is mounted in a hybrid vehicle that includes an engine and an electric motor for driving wheels. The technologies disclosed by this specification are also suitably applicable to electric vehicles that have no engine and travel only by an electric motor.

While concrete embodiments of the invention have been described in detail above, these embodiments are merely illustrative, and the scope defined by the appended claims is not limited to these embodiments. The technologies described in the claims include various modifications and changes of the above-illustrated concrete embodiments.

The liquid leakage detection sensor may include, for example, a plurality of flow sensors that are provided in the coolant passage. If the values detected by two adjacent flow sensors are different from each other, it can be detected that liquid leakage (coolant leakage) is present between the two flow sensors. In the case where liquid leakage is detected by using flow sensors, it is preferable that the flow sensors and the valves be disposed in pairs. In the case where liquid leakage is detected between two adjacent flow sensors, it suffices that the valves each of which makes a pair with a corresponding one of the two flow sensors are closed. That is, since the flow sensors and the valves make pairs, the number of locations at which liquid leakage can be detected and the number of valves become optimum.

In order to maintain the cooling capability as much as possible by using the remaining coolant after stopping liquid leakage, it is preferable that the controller be configured to drive the coolant circulation pump so as to periodically reverse the flow direction of the coolant after closing the valves provided at the two locations. Even when the coolant does not circulate in a direction, greater amounts of the coolant, even a slightly greater amount thereof, will achieve higher cooling capability as compared to the case where the coolant is stagnant.

In the case where the reserve tank for temporarily storing the coolant is provided on the coolant passage, it is preferable that the controller be configured to close one of the two valves provided at the two locations, between which the portion where liquid leakage has been detected is located, and to drive the coolant circulation pump so that the coolant flows in a direction from the other valve toward the reserve tank, and then close the other valve. By carrying out this procedure, it is possible to return the coolant from the vicinity of the location of liquid leakage to the reserve tank.

It is also preferable that the cooling system further include a bypass passage for bypassing the valves provided at the two locations when the valves at the two locations are closed. This is because such a construction makes it possible to continue to circulate the coolant while bypassing the coolant around the portion of liquid leakage.

In the case where the reserve tank for temporarily storing the coolant is provided on the coolant passage, it is preferable that the electric vehicle further include a collision determination system configured to determine whether the electric vehicle has collided and, if it is determined that the electric vehicle has collided, send to the controller a signal that shows that the electric vehicle has collided, and the controller be configured so that, when liquid leakage is detected and the controller receives a signal that shows the occurrence of a collision, the controller drives the coolant circulation pump to cause the coolant to flow from the reserve tank toward an appliance that is one of the inverter and the electric motor and that is used to discharge the electric charge stored in the inverter. By concentrating the coolant as much as possible to the appliance that is used to discharge the electric charge, it is possible to restrain the temperature rise in the appliance that is used to discharge the electric charge immediately after a collision is detected. Incidentally, an airbag system may be used as the collision determination system, for example. The signal that shows the occurrence of a collision is output if, for example, the sensor data from the acceleration sensor provided in the airbag system exceeds a predetermined acceleration threshold value.

The controller may be configured to operate the coolant circulation pump in at least two modes that include the low-operation-speed mode and the high-operation-speed mode. In such a case, it is preferable that the controller, upon detection of liquid leakage, operate the coolant circulation pump in the high-operation-speed mode.

What is claimed is:

1. An electric vehicle comprising:
   an electric motor;
   an inverter that supplies electric power to the electric motor;
   a radiator that cools a coolant;
   a coolant passage configured to circulate the coolant through the electric motor, the inverter and the radiator;
   a coolant circulation pump provided on the coolant passage;
   a plurality of liquid leakage detection sensors provided in the coolant passage;
   a plurality of valves provided in the coolant passage; and
   a controller configured to close, of the plurality of valves, valves provided at two locations, between which a portion where liquid leakage has been detected by the liquid leakage detection sensors is located, and the controller is configured to drive the coolant circulation pump so that a flow direction of the coolant is periodically reversed, after closing the valves provided at the two locations, to continue to circulate the coolant through the coolant passage.

2. The electric vehicle according to claim 1, further comprising
   a reserve tank that is provided on the coolant passage so as to temporarily store the coolant, wherein
   the controller is configured to close one of the valves provided at the two locations, between which the portion where the liquid leakage has been detected is located, and to drive the coolant circulation pump so that the coolant flows in a direction from the other of the valves provided at the two locations toward the reserve tank, and to then close the other of the valves provided at the two locations.

3. The electric vehicle according to claim 1, further comprising
   a bypass passage for bypassing the valves provided at the two locations when the valves provided at the two locations are closed.

4. The electric vehicle according to claim 1, further comprising:
   a reserve tank that is provided on the coolant passage so as to temporarily store the coolant; and
   a collision determination system configured to determine whether the electric vehicle has collided and, if it is determined that the electric vehicle has collided, send to the controller a signal that shows that the electric vehicle has collided, wherein
   the controller is configured so that, if the liquid leakage is detected and the controller receives the signal showing that the electric vehicle has collided, the controller drives the coolant circulation pump to cause the coolant to flow from the reserve tank toward an appliance that is one of the inverter and the electric motor and that is used to discharge electric charge stored in the inverter.

5. The electric vehicle according to claim 1, wherein
   the controller is configured to operate the coolant circulation pump in at least two modes that include a low-operation-speed mode and a high-operation-speed mode; and
   the controller is configured to operate the coolant circulation pump in the high-operation-speed mode if the liquid leakage is detected.

6. An electric vehicle comprising:
   a cooling system that cools a heat-producing object by a coolant and that includes a radiator that cools the coolant, a coolant passage configured to circulate the coolant through the heat-producing object and the radiator, and a coolant circulation pump provided on the coolant passage;
   a plurality of liquid leakage detection sensors provided in the coolant passage;
   a plurality of valves provided in the coolant passage; and
   a controller configured to close, of the plurality of valves, valves provided at two locations, between which a portion where liquid leakage has been detected by the liquid leakage detection sensors is located, and the controller is configured to drive the coolant circulation pump so that a flow direction of the coolant is periodically reversed, after closing the valves provided at the two locations, to continue to circulate the coolant through the coolant passage.

7. The electric vehicle according to claim 6, wherein
   the coolant circulation pump is able to reverse discharge direction in which the coolant circulation pump discharges the coolant.

8. The electric vehicle according to claim 7, further comprising
   a reserve tank that is provided on the coolant passage so as to temporarily store the coolant, wherein
   the controller is configured to close one of the valves provided at the two locations, between which the portion where the liquid leakage has been detected is located, and to drive the coolant circulation pump so that the coolant flows from the other of the valves provided at the two locations toward the reserve tank, and to then close the other of the valves provided at the two locations.

9. The electric vehicle according to claim 6, further comprising
   a bypass passage for bypassing the valves provided at the two locations when the valves provided at the two locations are closed.

10. The electric vehicle according to claim 6, wherein
    the heat-producing object includes an electric motor and an inverter that supplies electric power to the electric motor.

11. The electric vehicle according to claim 10, further comprising:
    a reserve tank that is provided on the coolant passage so as to temporarily store the coolant; and
    a collision determination system configured to determine whether the electric vehicle has collided and, if it is determined that the electric vehicle has collided, send to the controller a signal that shows that the electric vehicle has collided, wherein
    the controller is configured so that, if the liquid leakage is detected and the controller receives the signal showing that the electric vehicle has collided, the controller drives the coolant circulation pump to cause the coolant to flow from the reserve tank toward an appliance that is one of the inverter and the electric motor and that is used to discharge electric charge stored in the inverter.

12. The electric vehicle according to claim 6, wherein
    the controller is configured to be able to operate the coolant circulation pump in at least two modes that include a low-operation-mode and a high-operation-speed mode; and
    the controller is configured to operate the coolant circulation pump in the high-operation-speed mode if the liquid leakage is detected.

* * * * *